(12) United States Patent
Meshkati et al.

(10) Patent No.: US 9,756,534 B2
(45) Date of Patent: Sep. 5, 2017

(54) MANAGEMENT OF INTER-FREQUENCY MEASUREMENTS

(71) Applicant: QUALCOMM Incorporated, San Diego, CA (US)

(72) Inventors: Farhad Meshkati, San Diego, CA (US); Ahmed Kamel Sadek, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/859,686

(22) Filed: Sep. 21, 2015

(65) Prior Publication Data

US 2017/0086108 A1 Mar. 23, 2017

(51) Int. Cl.
*H04W 36/00* (2009.01)
*H04W 24/10* (2009.01)
*H04W 8/08* (2009.01)

(52) U.S. Cl.
CPC ......... *H04W 36/0083* (2013.01); *H04W 8/08* (2013.01); *H04W 24/10* (2013.01); *H04W 36/0088* (2013.01); *H04W 36/0094* (2013.01)

(58) Field of Classification Search
CPC ..... H04W 24/10; H04W 36/04; H04W 24/02; H04W 36/0083; H04W 36/32; H04W 84/045; H04W 36/30; H04W 36/0061; H04W 8/08; H04W 4/06
USPC ............. 455/432.1–434, 436–444, 450–455, 455/507–525; 370/328–334, 338
See application file for complete search history.

(56) References Cited

U.S. PATENT DOCUMENTS

| | | | |
|---|---|---|---|
| 8,437,753 B2 * | 5/2013 | Kim | H04W 24/10 370/254 |
| 8,731,477 B2 | 5/2014 | Ekici | |
| 8,837,433 B2 | 9/2014 | Amerga et al. | |
| 2012/0046066 A1 | 2/2012 | Tamura et al. | |
| 2013/0189971 A1 | 7/2013 | Callender et al. | |

(Continued)

FOREIGN PATENT DOCUMENTS

| | | |
|---|---|---|
| EP | 2717625 A1 | 4/2014 |
| WO | 2012078565 A1 | 6/2012 |
| WO | 2014051333 A1 | 4/2014 |

OTHER PUBLICATIONS

International Search Report and Written Opinion—PCT/US2016/052094—ISA/EPO—dated Nov. 29, 2016.

*Primary Examiner* — Allahyar Kasraian
(74) *Attorney, Agent, or Firm* — Muncy, Geissler, Olds & Lowe, P.C.

(57) ABSTRACT

Techniques for prioritizing inter-frequency measurements are disclosed. The method may include identifying a first frequency for measurement that is associated with mobility of an access terminal for transitioning from a serving primary cell to a target primary cell, identifying a second frequency for measurement that is associated with supplemental capacity of the access terminal for adding a secondary cell to operate in conjunction with the serving primary cell, prioritizing the mobility of the access terminal or the supplemental capacity of the access terminal, selecting for measurement in a measurement period either the first frequency or the second frequency based on the prioritizing, and triggering a measurement for the selected frequency.

30 Claims, 7 Drawing Sheets

(56) References Cited

U.S. PATENT DOCUMENTS

| | | | |
|---|---|---|---|
| 2013/0343346 A1* | 12/2013 | Chen | H04W 72/082 |
| | | | 370/332 |
| 2014/0031041 A1* | 1/2014 | Jung | H04W 36/30 |
| | | | 455/437 |
| 2014/0192781 A1 | 7/2014 | Teyeb et al. | |
| 2014/0269469 A1 | 9/2014 | Tran et al. | |
| 2014/0364129 A1* | 12/2014 | Xiao | H04W 36/0083 |
| | | | 455/444 |
| 2015/0236782 A1 | 8/2015 | Kadous et al. | |
| 2016/0057708 A1* | 2/2016 | Siomina | H04W 52/243 |
| | | | 455/452.2 |
| 2016/0183147 A1* | 6/2016 | Da Silva | H04W 36/0055 |
| | | | 370/331 |
| 2016/0219473 A1* | 7/2016 | Teyeb | H04W 36/0088 |

* cited by examiner

MANAGEMENT OF INTER-FREQUENCY MEASUREMENTS

INTRODUCTION

Aspects of this disclosure relate generally to telecommunications, and more particularly to the management of inter-frequency measurements.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In a wireless communication system, an access terminal will intermittently measure particular frequencies within the surrounding wireless environment ("inter-frequency" measurements) and report the results of the measurements to an access point. The measurements enable the access point to ascertain the radio coverage conditions throughout the coverage area and thereby perform communication-related tasks more effectively.

In a typical scenario, the access point will transmit a measurement request that identifies a plurality of frequencies. The access terminal will select one of the plurality of frequencies, perform a measurement on the selected frequency, and then select another of the plurality of frequencies. The access terminal will continue to select frequencies in a round-robin manner and intermittently report the measurements back to the access point.

As wireless networks become increasingly dynamic, they come to rely more heavily on the measurements of the surrounding wireless environment. Solutions are needed for ensuring that the most relevant inter-frequency measurements are performed first.

SUMMARY

Techniques for management of inter-frequency measurements and related operations are disclosed.

In one example, a method of managing inter-frequency measurements is disclosed. The method may include, for example, identifying a first frequency for measurement that is associated with mobility of an access terminal for transitioning from a serving primary cell to a target primary cell, identifying a second frequency for measurement that is associated with supplemental capacity of the access terminal for adding a secondary cell to operate in conjunction with the serving primary cell, prioritizing the mobility of the access terminal or the supplemental capacity of the access terminal, selecting for measurement in a measurement period either the first frequency or the second frequency based on the prioritizing, and triggering a measurement for the selected frequency.

In another example, an apparatus for managing inter-frequency measurements is disclosed. The apparatus may include, for example, a frequency identifier configured to identify a first frequency for measurement that is associated with mobility of an access terminal for transitioning from a serving primary cell to a target primary cell and identify a second frequency for measurement that is associated with supplemental capacity of the access terminal for adding a secondary cell to operate in conjunction with the serving primary cell, a prioritizer configured to prioritize the mobility of the access terminal or the supplemental capacity of the access terminal, a measurement selector configured to select for measurement in a measurement period either the first frequency or the second frequency based on the prioritizing, and a communication controller configured to trigger a measurement for the selected frequency.

In another example, another apparatus for managing inter-frequency measurements is disclosed. The apparatus may include, for example, means for identifying a first frequency for measurement that is associated with mobility of an access terminal for transitioning from a serving primary cell to a target primary cell, means for identifying a second frequency for measurement that is associated with supplemental capacity of the access terminal for adding a secondary cell to operate in conjunction with the serving primary cell, means for prioritizing the mobility of the access terminal or the supplemental capacity of the access terminal, means for selecting for measurement in a measurement period either the first frequency or the second frequency based on the prioritizing, and means for triggering a measurement for the selected frequency.

In another example, a non-transitory computer-readable medium including code, which, when executed by a processor, causes the processor to perform operations for managing inter-frequency measurements is disclosed. The computer-readable medium may include, for example, code for identifying a first frequency for measurement that is associated with mobility of an access terminal for transitioning from a serving primary cell to a target primary cell, code for identifying a second frequency for measurement that is associated with supplemental capacity of the access terminal for adding a secondary cell to operate in conjunction with the serving primary cell, code for prioritizing the mobility of the access terminal or the supplemental capacity of the access terminal, code for selecting for measurement in a measurement period either the first frequency or the second frequency based on the prioritizing, and code for triggering a measurement for the selected frequency.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
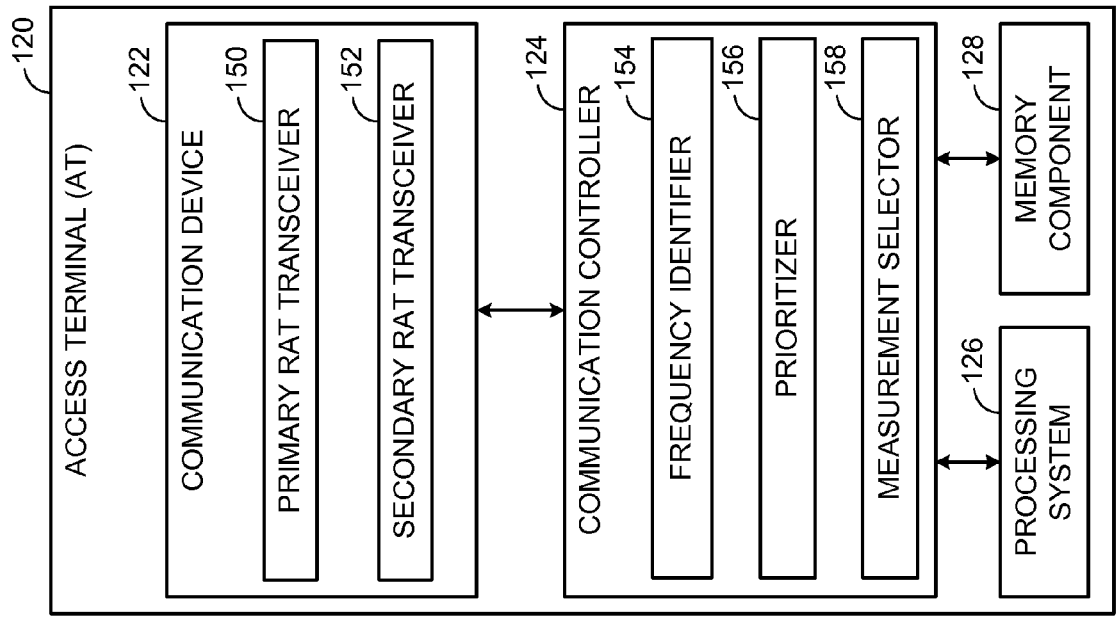
FIG. 1 illustrates an example wireless communication system including an access point in communication with an access terminal in accordance with an aspect of the disclosure.
Figure 1:
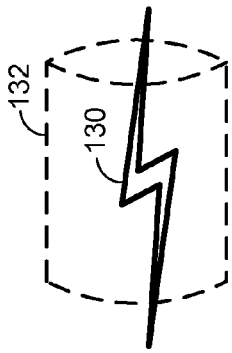
Figure 1:
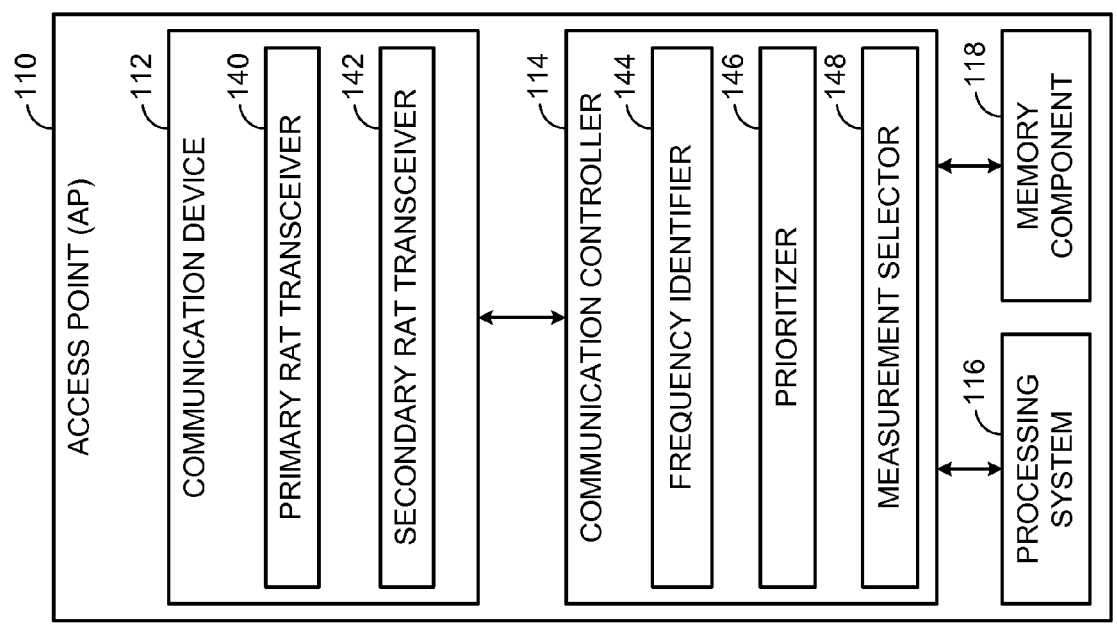

The present disclosure relates generally to wireless communication system, and particularly to management of inter-frequency measurements in wireless communication systems.

As noted above, an access terminal may perform inter-frequency measurements of the surrounding wireless environment in order to better facilitate the completion of communication-related tasks. The access terminal may perform the measurements at the request of an access point (for example, the access point that maintains the access terminal's serving cell) and may report the results of the measurements to the access point.

In a typical scenario, the access point will transmit a measurement request that identifies a plurality of frequencies (a request for "inter-frequency" measurements). The access terminal will perform the requested measurements in a round-robin manner and intermittently report the measurements back to the access point. However, as the functionality of the access point and access terminal improves, an opportunity arises for more intelligent selection of frequencies on which to perform inter-frequency measurements.

In one possible implementation, an access point or access terminal will identify one or more frequencies as being related to mobility considerations. As a result, when it is determined that an access terminal is handing over (or preparing to hand over), mobility related frequencies can be prioritized for measurement. As a result, an access terminal can abandon the default method for performing inter-frequency measurements (the round-robin method) in favor of an approach that prioritizes inter-frequency measurement that are potentially relevant for mobility purposes. Similarly, an access point or access terminal can identify one or more frequencies associated with supplemental capacity. As a result, when it is determined that an access point may need to establish a secondary cell (or that an access terminal may need to utilize supplemental capacity), the access terminal can prioritize inter-frequency measurements that are potentially relevant to the establishment of the secondary cell.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

FIG. 1 illustrates an example wireless communication system including an access point 110 in communication with an access terminal 120. Unless otherwise noted, the terms "access terminal" and "access point" are not intended to be specific or limited to any particular Radio Access Technology (RAT). In general, access terminals may be any wireless communication device allowing a user to communicate over a communications network (e.g., a mobile phone, router, personal computer, server, entertainment device, Internet of Things (IOT)/Internet of Everything (IOE) capable device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or several RATs in communicating with access terminals depending on the network in which the access point is deployed, and may be alternatively referred to as a Base Station (BS), a Network Node, a NodeB, an evolved NodeB (eNB), etc. Such an access point may correspond to a small cell access point, for example. "Small cells" generally refer to a class of low-powered access points that may include or be otherwise referred to as femto cells, pico cells, micro cells, Wi-Fi APs, other small coverage area APs, etc. Small cells may be deployed to supplement macro cell coverage, which may cover a few blocks within a neighborhood or several square miles in a rural environment, thereby leading to improved signaling, incremental capacity growth, richer user experience, and so on.

In the example of FIG. 1, the access point 110 and the access terminal 120 each generally include a wireless communication device (represented by the communication devices 112 and 122) for communicating with other network nodes via at least one designated RAT. The communication devices 112 and 122 may be variously configured for transmitting and encoding signals (e.g., messages, indications, information, and so on), and, conversely, for receiving and decoding signals (e.g., messages, indications, information, pilots, and so on) in accordance with the designated RAT. The access point 110 and the access terminal 120 may also each generally include a communication controller (represented by the communication controllers 114 and 124) for controlling operation of their respective communication devices 112 and 122 (e.g., directing, modifying, enabling, disabling, etc.). The communication controllers 114 and 124 may operate at the direction of or otherwise in conjunction with respective host system functionality (illustrated as the processing systems 116 and 126 and the memory components 118 and 128). In some designs, the communication controllers 114 and 124 may be partly or wholly subsumed by the respective host system functionality.

Turning to the illustrated communication system in more detail, the access terminal 120 may transmit and receive messages via a wireless link 130 with the access point 110. The message may include information related to various types of communication (e.g., voice, data, multimedia services, associated control signaling, etc.). The wireless link 130 may operate over a communication medium of interest, shown by way of example in FIG. 1 as the medium 132, which may be shared with other communication systems as well as other RATs. A medium of this type may be composed of one or more frequency, time, and/or space communication resources (e.g., encompassing one or more channels across one or more carriers) associated with communication between one or more transmitter/receiver pairs, such as the access point 110 and the access terminal 120 for the medium 132.

As a particular example, the medium 132 may correspond to at least a portion of an unlicensed frequency band shared with other RATs. In general, the access point 110 and the access terminal 120 may operate via the wireless link 130 according to one or more RATs depending on the network in which they are deployed. These networks may include, for example, different variants of Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, and so on. Although different licensed frequency bands have been reserved for such communications (e.g., by a government entity such as the Federal Communications Commission (FCC) in the United States), certain communication networks, in particular those employing small cell access points, have extended operation into unlicensed frequency bands such as the Unlicensed National Information Infrastructure (U-NII) band used by Wireless Local Area Network (WLAN) technologies, most notably IEEE 802.11x WLAN technologies generally referred to as "Wi-Fi."

In the example of FIG. 1, the communication device 112 of the access point 110 includes two co-located transceivers operating according to respective RATs, including a primary RAT transceiver 140 configured to operate in accordance with one RAT and a secondary RAT transceiver 142 configured to operate in accordance with another RAT. As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a Wi-Fi chip or similar circuitry simply providing low-level sniffing) . Further, as used herein, the term "co-located" may refer to one of various arrangements (e.g., radios, access points, transceivers, etc.). For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The primary RAT transceiver 140 and the secondary RAT transceiver 142 may provide different functionalities and may be used for different purposes. As an example, the primary RAT transceiver 140 may operate in accordance with Long Term Evolution (LTE) technology to provide communication with the access terminal 120 on the wireless link 130, while the secondary RAT transceiver 142 may operate in accordance with Wi-Fi technology to monitor Wi-Fi signaling on the medium 132 that may interfere with or be interfered with by the LTE communications. The secondary RAT transceiver 142 may or may not serve as a full Wi-Fi AP providing communication services to a corresponding Basic Service Set (BSS). The communication device 122 of the access terminal 120 may, in some designs, include similar primary RAT transceiver and/or secondary RAT transceiver functionality, as shown in FIG. 1 by way of the primary RAT transceiver 150 and the secondary RAT transceiver 152, although such dual-transceiver functionality may not be required.

As will be discussed in more detail below with reference to FIGS. 2-8, the communication controller 114 of the access point 110 may include a frequency identifier 144, a prioritizer 146, and a measurement selector 148, which may operate in conjunction with the primary RAT transceiver 140 and/or the secondary RAT transceiver 142 to manage operation on the medium 132. Moreover, the communication controller 124 of the access terminal 120 may include a frequency identifier 154, a prioritizer 156, and a measurement selector 158, which may operate in conjunction with the primary RAT transceiver 150 and/or the secondary RAT transceiver 152 to manage operation on the medium 132.

Figure 2:
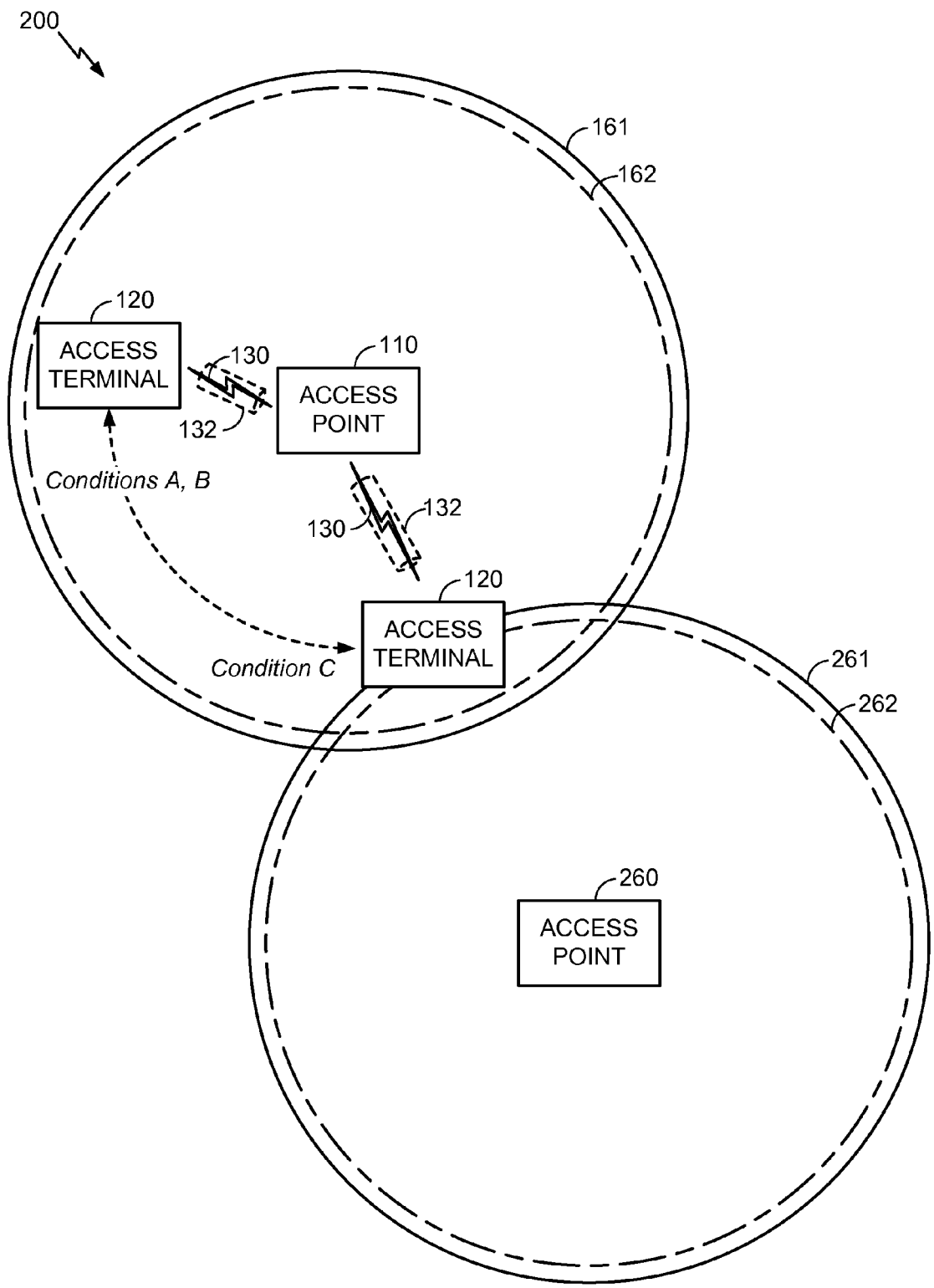
FIG. 2 illustrates an example of a wireless environment in which the access point and access terminal communicate in accordance with an aspect of the disclosure.

FIG. 2 is an example of a wireless environment 200 in accordance with an aspect of the disclosure. In wireless environment 200, the access point 110 and access terminal 120 communicate over medium 132 via wireless link 130. For illustration purposes, the access terminal 120 is depicted in two distinct positions. In this example, the first position corresponds to a Condition A and a Condition B of the access terminal 120, and the second position corresponds to a Condition C of the access terminal 120. Condition A, Condition B, and Condition C will be explained in greater detail below.

The access point 110 is associated with a primary cell 161. The primary cell 161 corresponds to the coverage area of the access point 110, i.e., the area in which the access point 110 can establish wireless links with access terminals (analogous to the wireless link 130 established with access terminal 120).

Condition A is a condition in which the access terminal 120 is within the primary cell 161, and can adequately perform all necessary communications with the access point 110. In Condition A, the primary cell 161 is sufficient to serve the access terminal 120.

The access point 110 is also associated with a secondary cell 162, which corresponds to a supplemental capacity coverage area. The secondary cell 162 can be selectively activated by the access point 110 when necessary. Although the secondary cell 162 is depicted as a smaller circular area within the primary cell 161, it will be understood that this is purely for illustrative purposes. Either of the primary cell 161 or the secondary cell 162 may be entirely coincident with the other, partially overlapping with the other, or wholly encompassed by the other. Both the primary cell 161 and secondary cell 162 are provided within the medium 132, and the wireless link 130 may include signaling associated with the primary cell 161, the secondary cell 162, or both. Moreover, each access point 110 may provide a plurality of secondary cells, which may be established as needed.

Condition B is a condition of the access terminal 120 in which the access terminal 120 is utilizing (or preparing to utilize) the supplemental capacity of the secondary cell 162. In Condition B, the utilization associated with the primary cell 161 is approaching its limit, and communications between the access point 110 and access terminal 120 can not be satisfactorily performed unless the secondary cell 162 is utilized. In order to utilize the supplementary capacity of the secondary cell 162, the access point 110 and access terminal 120 may modify (or prepare to modify) the wireless link 130 to include operations using the secondary cell 162.

Condition B may also be a condition in which both the primary cell 161 and the secondary cell 162 are both approaching their respective utilization limits, at which point the access point 110 and access terminal 120 may modify (or prepare to modify) the wireless link 130 to include operations using yet another secondary cell (not shown).

The wireless environment 200 of FIG. 2 also depicts a neighbor access point 260 associated with a primary cell 261 and (optionally) a secondary cell 262. The neighbor access point 260, primary cell 261, and secondary cell 262 may be analogous to the access point 110, primary cell 161, and secondary cell 162 described above. The neighbor access point 260 has a coverage area that is adjacent to, or overlapping with, the coverage area of the access point 110.

Condition C is a condition of the access terminal 120 in which the access terminal 120 is within the primary cell 161, but is also within (or at least approaching) the primary cell 261. When the access terminal 120 approaches the primary cell 261, a handover from the primary cell 161 to the primary cell 261 may be anticipated. When handing over (or preparing to hand over) from the primary cell 161 to the primary cell 261, the primary cell 161 may be referred to as a serving primary cell, and the primary cell 261 may be referred to as a target primary cell.

Although the primary cell 261 is shown as being located separately from the primary cell 161 (and associated with a separately-located access point), it will be understood that a single access point can establish multiple primary cells, and that in some implementations, an access terminal can hand over from a first primary cell associated with a single access point to a second primary cell associated with the same access point.

When it is in any of Conditions A-C, the access terminal 120 may intermittently perform measurements on the medium 132. The measurements may be inter-frequency measurements, i.e., measurements that are performed on different frequencies. The frequencies to be measured may include, for example, frequencies in licensed spectrum (for example, LTE-related frequencies) and/or frequencies in unlicensed spectrum (for example, frequencies in the U-NII band). The measurements to be performed by the access point 110 may include, for example, measurements of reference signal received power (RSRP), reference signal received quality (RSRQ), received signal strength indication (RSSI), etc.

The inter-frequency measurements performed by the access terminal 120 may be responsive to a measurement request signal received from the access point 110. As an example, access point 110 may send a measurement request signal to the access terminal 120. The measurement request signal may identify, for example, one or more frequencies to measure, one or more measurements to perform on each of the one or more frequencies, and/or one or more time periods over which to measure each of the one or more frequencies.

The measurement request signal may identify a plurality of measurements. In some implementations, the access terminal 120 performs each of the measurements identified in the measurement request signal. In other implementations, the access terminal 120 does not perform all of the measurements identified in the measurement request signal. Instead, the access terminal 120 may perform none of, or only a portion of the requested measurements, and moreover, may select the measurement or measurements that it will perform, the order in which the measurements will be performed, and/or the timing of the measurements. Additionally or alternatively, the access terminal 120 may perform measurements that are not requested by the access point 110.

The access terminal 120 may also generate a measurement report signal that it transmits to the access point 110. The measurement report signal may include one or more measurement reports relating to respective inter-frequency measurements performed by the access terminal 120. The measurement report signal may include all or a portion of the results of measurements requested by the access point 110. Additionally or alternatively, the measurement report signal may include measurement results that were not requested by the access point 110.

In accordance with an aspect of the disclosure, the condition of the access terminal 120 is taken into account when determining which measurements are to be performed. For example, when the access point 110 is generating a measurement request signal, it may select the particular frequency to be measured based on the condition of the access terminal 120.

As will be understood from FIG. 2 and the foregoing description, an access terminal 120 that is in Condition C will generally be concerned with the mobility of the access terminal 120, i.e., its ability to hand over from the serving primary cell 161 to the target primary cell 261. By contrast, an access terminal 120 that is in Condition A or Condition B will generally be less concerned with mobility. Moreover, an access terminal 120 in Condition B may be especially concerned with supplemental capacity relative to an access terminal in Condition A or Condition C.

Figure 3:
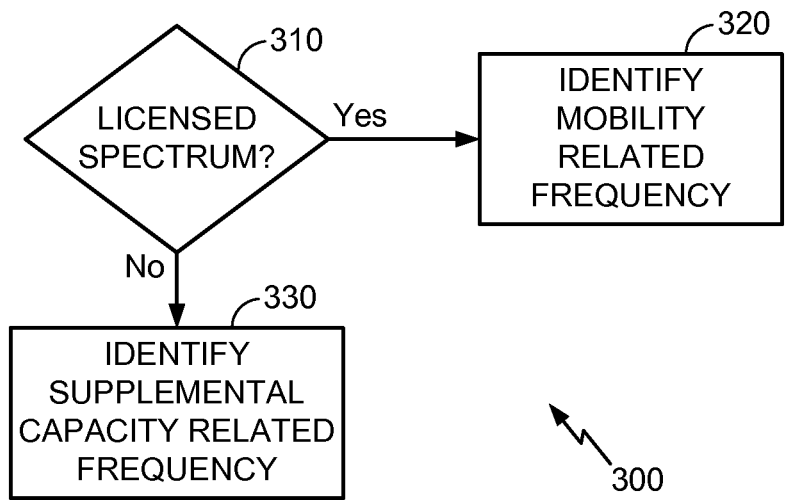
FIG. 3 illustrates an example method for identifying a specific frequency as being related to mobility or supplemental capacity in accordance with an aspect of the disclosure.

FIG. 3 generally illustrates an example method 300 for identifying a specific frequency as being related to mobility or supplemental capacity. The method 300 may be performed by an access point such as, for example, the access point 110 of FIGS. 1-2. The method 300 may also be performed by an access terminal such as, for example, the access terminal 120 of FIGS. 1-2.

At 310, it is determined whether a given frequency is from a licensed portion of the spectrum. In the United States, for example, the 1.9 GHz spectrum has been used as a licensed spectrum for broadband wireless devices, whereas the unlicensed spectrums are at 2.4 GHz and at 5.2 GHz. Outside the United States, the 3.5 GHz spectrum has been the most widely used licensed spectrum for broadband wireless devices. The licensed spectrum includes all frequency bands that require a license to operate a wireless device. In the licensed spectrum, only the spectrum licensee can build infrastructure, and allow communications and offer services across its spectrum range.

If it is determined at 310 that the frequency is from a licensed portion of the spectrum, then the method 300 proceeds to 320, where the frequency is identified as a mobility related frequency. On the other hand, if it is determined at 310 that the frequency is not from a licensed portion of the spectrum, then the method 300 proceeds to 330, where the frequency is identified as a supplemental capacity related frequency.

The access point 110 may perform the method 300 using the frequency identifier 144, whereas the access terminal 120 may perform the method 300 using the frequency identifier 154. The method 300 may be performed multiple times for a plurality of frequencies. In one possible implementation, the frequency identifiers 144, 154 use a lookup table that cross-references a given frequency or band of frequencies to either licensed spectrum or unlicensed spectrum. The lookup table may be stored in, for example, the respective memory components 118, 128 of the access point 110 and access terminal 120.

Figure 4:
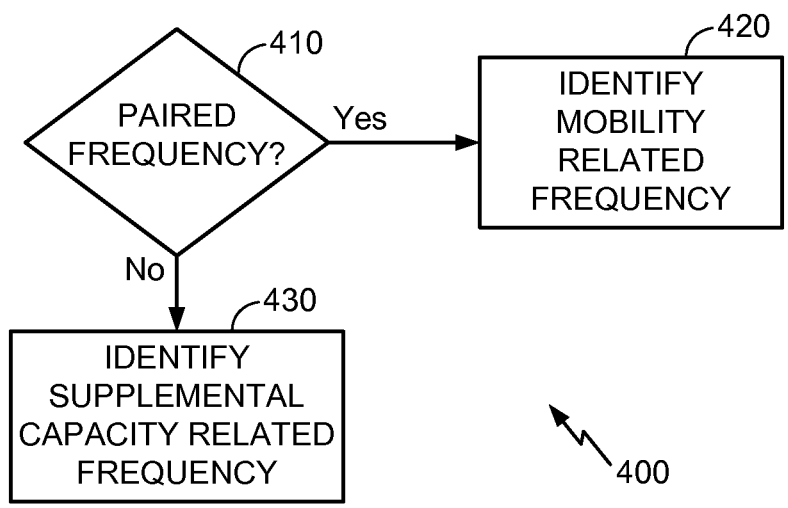
FIG. 4 illustrates another example method for identifying a specific frequency as being related to mobility or supplemental capacity in accordance with an aspect of the disclosure.

FIG. 4 generally illustrates another example method 400 for identifying a specific frequency as being related to mobility or supplemental capacity. The method 400 may be performed by an access point such as, for example, the access point 110 of FIGS. 1-2. The method 400 may also be performed by an access terminal such as, for example, the access terminal 120 of FIGS. 1-2.

At 410, it is determined whether a given frequency is associated with a downlink-uplink frequency pair. For example, if a particular frequency is associated with a downlink, then it may be determined whether that frequency is paired with an associated uplink frequency, as in a frequency-division duplexing (FDD) scheme. As another example, it may be determined whether a particular frequency is associated with a time-division duplexing (TDD) scheme, in which a single frequency supports uplink and downlink during different time periods.

If it is determined at 410 that the frequency is associated with a downlink-uplink frequency pair, then the method 400 proceeds to 420, where the frequency is identified as a mobility related frequency. On the other hand, if it is determined at 410 that the frequency is not associated with a downlink-uplink frequency pair, then the method 400 proceeds to 430, where the frequency is identified as a supplemental capacity related frequency.

The access point 110 may perform the method 400 using the frequency identifier 144, whereas the access terminal 120 may perform the method 400 using the frequency identifier 154. The method 400 may be performed multiple times for a plurality of frequencies. In one possible implementation, the frequency identifiers 144, 154 use a lookup table that identifies a given frequency or band of frequencies as being either paired or unpaired. The lookup table may be stored in, for example, the respective memory components 118, 128 of the access point 110 and access terminal 120.

The method 300 of FIG. 3 and the method 400 may be considered alternative methods of identifying a particular frequency as being related to mobility or supplemental capacity. On the other hand, the frequency identifiers 144, 154 may perform the methods 300, 400 in tandem. For example, in one possible implementation, both methods 300, 400 are performed on a particular frequency, and the particular frequency is only identified as mobility-related if it in the licensed portion of the spectrum (as determined at 310) and associated with a downlink-uplink frequency pair (as determined at 410).

Figure 5:
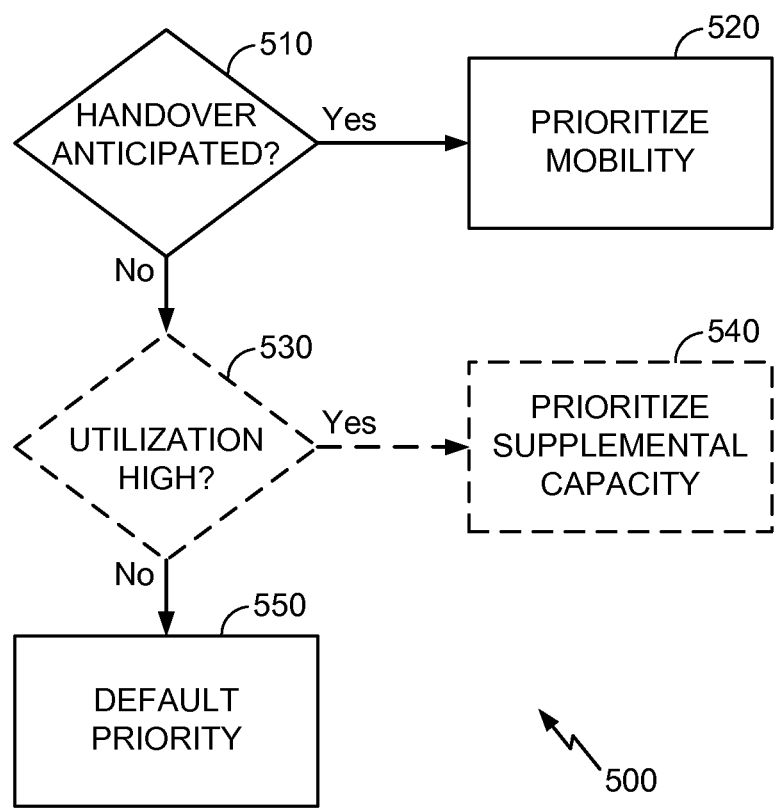
FIG. 5 illustrates an example method for prioritizing mobility or supplemental capacity in accordance with an aspect of the disclosure.

FIG. 5 generally illustrates an example method 500 for prioritizing mobility or supplemental capacity. The method 500 may be performed by an access point such as, for example, the access point 110 of FIGS. 1-2. The method 500 may also be performed by an access terminal such as, for example, the access terminal 120 of FIGS. 1-2. The access point 110 may perform the method 500 using the prioritizer 146, whereas the access terminal 120 may perform the method 500 using the prioritizer 156.

At 510, it is determined whether a handover is anticipated. For example, if an access terminal such as access terminal 120 is approaching the outer limit of the coverage area of the serving cell or within (or approaching) the coverage area of a neighboring cell (analogous to Condition C in FIG. 2), then the access terminal 120 itself may determine that it is anticipating a handover. Additionally or alternatively, the access point 110 may determine that the access terminal 120 is anticipating a handover.

In one possible implementation, the access terminal 120 operates in accordance with 3GPP protocols, and determines that an A2 event has occurred. As described in 3GPP TS 36.331, an A2 event may be recognized when the UE (analogous to access terminal 120 in this implementation) performs a measurement associated with a serving cell (analogous to access point 110 in this implementation). If the result of the measurement (for example, an RSRP measurement) falls below a predetermined threshold (for example, a configurable parameter value), then the A2 event has occurred. As noted above, the access terminal 120 may itself determine that an A2 event has occurred and may, as a result, determine at 510 that a handover is anticipated. Additionally or alternatively, the access terminal 120 may notify the access point 110 that an A2 event has occurred. Upon receiving the A2 event notification from the access terminal 120, the access point 110 may determine at 510 that a handover is anticipated.

In another possible implementation, the access terminal 120 uses automatic neighbor relation (ANR) functionality. ANR generally relates to discovery of neighboring access points and mapping of a Physical Cell Identifier (PCI) of a discovered access point to a Evolved Universal Terrestrial Radio Access Network Cell Global Identifier (eCGI) of the discovered access point. The access point 110 requests that access terminals such as access terminal 120 perform ANR-related measurements. In some scenarios, ANR-related measurements are requested from each access terminal in the primary cell 161, and in other scenarios, ANR-related measurements are requested from access terminals that are within (or at least approaching) boundary areas (for example, an area associated with overlapping coverage areas). The access terminal 120 may determine that an ANR-related measurement has been requested and/or performed and may, as a result, determine at 510 that a handover is anticipated. Additionally or alternatively, the access terminal 120 may notify the access point 110 of the result of an ANR-related measurement, or that an ANR-related measurement has been requested and/or performed. Upon receiving the automatic neighbor relation event notification from the access terminal 120, the access point 110 may determine at 510 that a handover is anticipated. In response to a determination at 510 that a handover is anticipated, the method 500 may proceed to 520, where mobility is prioritized. The prioritizer 146, 156 may perform prioritization by, for example, recording prioritization data for future retrieval. For example, the prioritization data may indicate that mobility is a priority. On the other hand, if it is determined at 510 that a handover is not anticipated, then the method 500 optionally proceeds to 530, or alternatively, proceeds to 550.

At 530, it is optionally determined whether utilization of the medium is high. This may be performed by monitoring utilization of the serving primary cell 161 and any existing secondary cells 162. For example, if a primary cell such as primary cell 161 is being heavily utilized (analogous to Condition B in FIG. 2), then the access point 110 may determine that a secondary cell such as secondary cell 162 should be established and/or utilized by the access terminal 120. Alternatively, the access point 110 may determine that both the primary cell 161 and the secondary cell 162 are being heavily utilized, and that another secondary cell (not shown) should be established and/or utilized by the access terminal 120. Additionally or alternatively, the access terminal 120 may determine that the primary cell 161 (and/or secondary cell 162) are being heavily utilized.

In one possible implementation, the access point 110 may monitor utilization by comparing the monitored utilization to a supplemental capacity threshold, for example, by determining when an amount of data scheduled for transmission within the primary cell 161 (and/or secondary cell 162) exceeds a supplemental capacity threshold. If the amount of data scheduled for transfer exceeds the supplemental capacity threshold, then the access point 110 may determine that the utilization of the medium is high. Additionally or alternatively, the access terminal 120 may quantify the amount of data scheduled awaiting transmission and determine whether the utilization of the medium is high. The amount of data may include an amount of data in an uplink or downlink queue, an amount of data associated with unfulfilled data requests, etc.

If it is determined at 530 that utilization of the medium is high, then the method 500 proceeds to 540, where supplemental capacity is prioritized. The prioritizers 146, 156 may perform prioritization by, for example, recording prioritization data for future retrieval. For example, the prioritization data may indicate that supplemental capacity is a priority. On the other hand, if it is determined at 530 that utilization of the medium is not high, then the method 500 proceeds to 550.

At 550, the prioritizers 146, 156 set or reset the prioritization data to a default setting. The prioritizers 146, 156 may perform prioritization by, for example, recording prioritization data for future retrieval.

Figure 6:
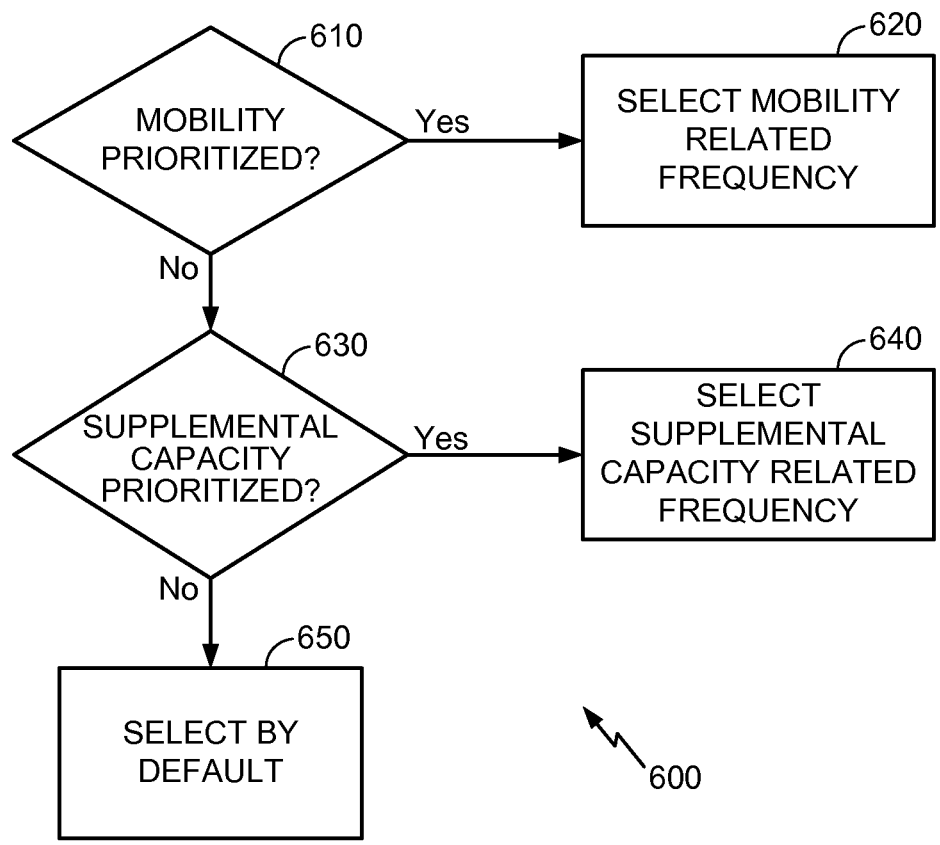
FIG. 6 illustrates an example method for selecting measurements to be performed in accordance with an aspect of the disclosure.

FIG. 6 generally illustrates an example method 600 for selecting measurements to be performed. The method 600 may be performed by an access point such as, for example, the access point 110 of FIGS. 1-2. The method 600 may also be performed by an access terminal such as, for example, the access terminal 120 of FIGS. 1-2. The access point 110 may perform the method 600 using the measurement selector 148, whereas the access terminal 120 may perform the method 600 using the measurement selector 158.

At 610, it is determined whether mobility is prioritized. In one possible implementation, the determination at 610 is performed by retrieving prioritization data recorded by the prioritizer 146 or the prioritizer 156 (for example, at 520 as depicted in FIG. 5). If it is determined at 610 that mobility is prioritized, then the method 600 proceeds to 620, where a mobility related frequency is selected for measurement. On the other hand, if it is determined at 610 that mobility is not prioritized, the method 600 proceeds to 630. In one possible implementation, the selection at 620 is performed by selecting a frequency identified by the frequency identifier 144 or the frequency identifier 154 (for example, at 320 as depicted in FIG. 3 or at 420 as depicted in FIG. 4).

At 630, it is determined whether supplemental capacity is prioritized. In one possible implementation, the determination at 630 is performed by retrieving prioritization data recorded by the prioritizer 146 or the prioritizer 156 (for example, at 540 as depicted in FIG. 5). If it is determined at 630 that supplemental capacity is prioritized, then the method 600 proceeds to 640, where a supplemental capacity related frequency is selected for measurement. On the other hand, if it is determined at 630 that supplemental capacity is not prioritized, the method 600 proceeds to 650, where a default frequency is selected for measurement. In one possible implementation, the selection at 640 is performed by selecting a frequency identified by the frequency identifier 144 or frequency identifier 154 (for example, at 330 as depicted in FIG. 3 or at 430 as depicted in FIG. 4).

Figure 7:
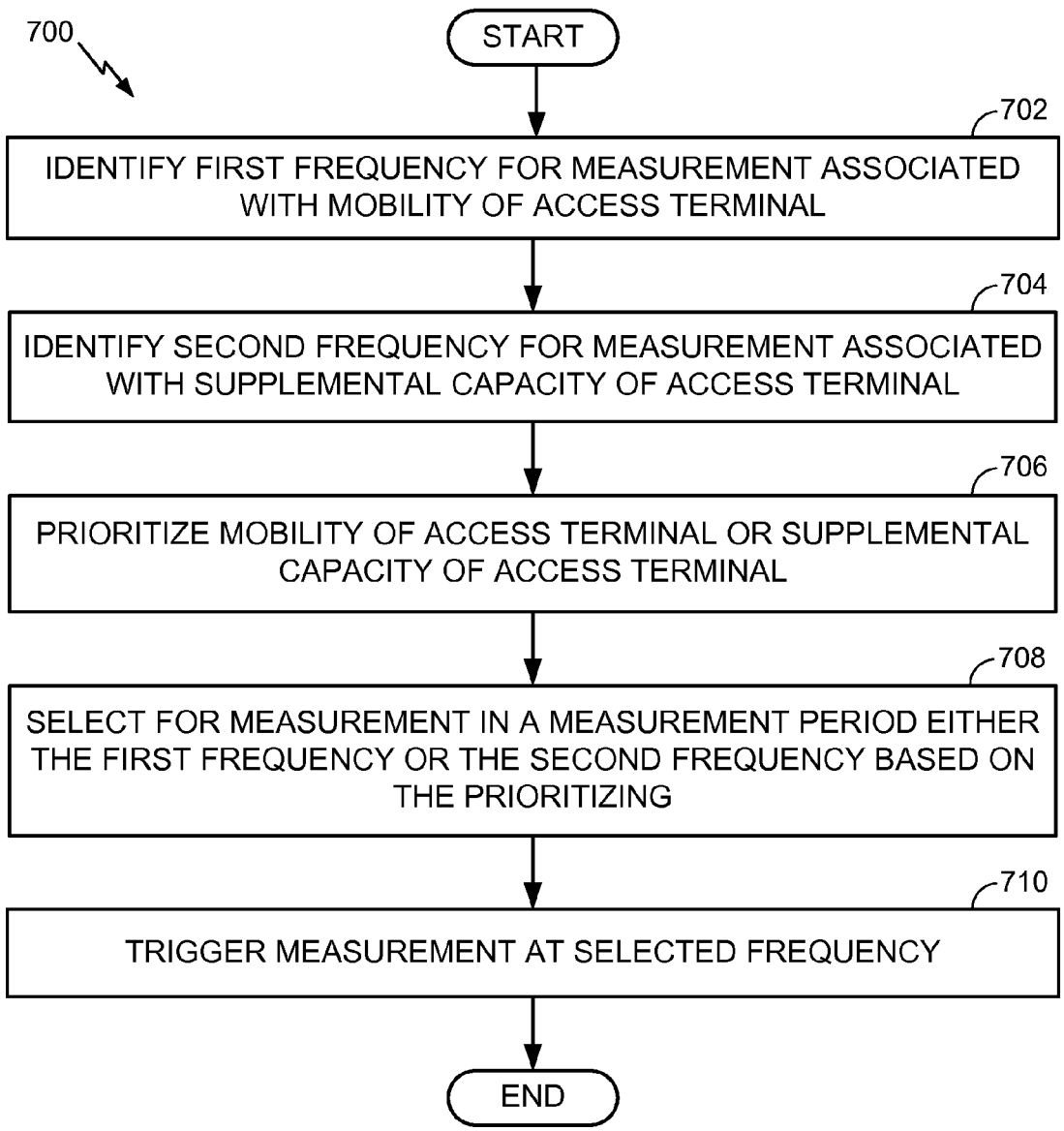
FIG. 7 is a flow diagram illustrating an example method of managing inter-frequency measurements in accordance with an aspect of the disclosure.

FIG. 7 is a flow diagram illustrating an example method 700 of managing inter-frequency measurements in accordance with the techniques described above. The method 700 may be performed, for example, by an access point (for example, the access point 110 illustrated in FIG. 1) or by an access terminal (for example, the access terminal 120 illustrated in FIG. 1).

As shown, the access point or access terminal may identify a first frequency for measurement associated with mobility of an access terminal (block 702). The identification may be performed in accordance with, for example, the method 300 depicted in FIG. 3, the method 400 depicted in FIG. 4, or a combination thereof. The identification may be performed, for example, by the frequency identifier 144 or frequency identifier 154 of FIG. 1. In some implementations, the frequency identifiers 144, 154 may operate in tandem with the respective processing systems 116, 126 and/or memory components 118, 128 depicted in FIG. 1.

The access point or access terminal may further identify a second frequency for measurement associated with supplemental capacity of the access terminal (block 704). The identification may be performed in accordance with, for example, the example method 300 depicted in FIG. 3, the method 400 depicted in FIG. 4, or a combination thereof. The identification may be performed, for example, by the frequency identifier 144 or frequency identifier 154 of FIG. 1. In some implementations, the frequency identifiers 144, 154 may operate in tandem with the respective processing systems 116, 126 and/or memory components 118, 128 depicted in FIG. 1.

The access point or access terminal may further prioritize mobility of the access terminal or supplemental capacity of the access terminal (block 706). The prioritization may be performed in accordance with, for example, the method 500 depicted in FIG. 5. The prioritization may be performed, for example, by the prioritizer 146 or prioritizer 156 of FIG. 1. In some implementations, the prioritizers 146, 156 may operate in tandem with the respective processing systems 116, 126 and/or memory components 118, 128 depicted in FIG. 1.

The access point or access terminal may further select for measurement in a measurement period either the first frequency or the second frequency based on the prioritizing (block 708). The selection may be performed in accordance with, for example, the method 600 depicted in FIG. 6. The selection may be performed, for example, by the measurement selector 148 or measurement selector 158 of FIG. 1. In some implementations, the measurement selectors 148, 158 may operate in tandem with the respective processing systems 116, 126 and/or memory components 118, 128 depicted in FIG. 1.

The access point or access terminal may further trigger a measurement at the selected frequency (block 710). If the triggering is performed by the access point (for example, the access point 110 of FIG. 1), then it may be performed by generating a measurement request that includes the selected measurement. Additionally or alternatively, the triggering performed at the access point may include transmitting the measurement request to, for example, an access terminal. The triggering may be performed, for example, by the primary RAT transceiver 140 and/or the secondary RAT transceiver 142 depicted in FIG. 1, operating under the control of the communication controller 114. In some implementations, the communication controller 114 and transceivers 140, 142 may operate in tandem with the processing systems 116 and/or memory component 118 depicted in FIG. 1.

If, on the other hand, the triggering is performed by the access terminal (for example, the access terminal 120 of FIG. 1, then the triggering may include performing the selected measurement. After performing the selected measurement, the access terminal may proceed to transmit the results of the measurement (for example, a measurement report) to an access point. The triggering may be performed, for example, by the primary RAT transceiver 150 and/or the secondary RAT transceiver 152 depicted in FIG. 1 (operating under the control of the communication controller 124). In some implementations, the transceivers 150, 152 may operate in tandem with the processing system 126 and/or memory component 128 depicted in FIG. 1.

For convenience, the access point 110 and the access terminal 120 are shown in FIG. 1 as including various components that may be configured according to the various examples described herein. It will be appreciated, however, that the illustrated blocks may be implemented in various ways. In some implementations, the components of FIG. 1 may be implemented in one or more circuits such as, for example, one or more processors and/or one or more ASICs (which may include one or more processors). Here, each circuit may use and/or incorporate at least one memory component for storing information or executable code used by the circuit to provide this functionality.

Figure 8:
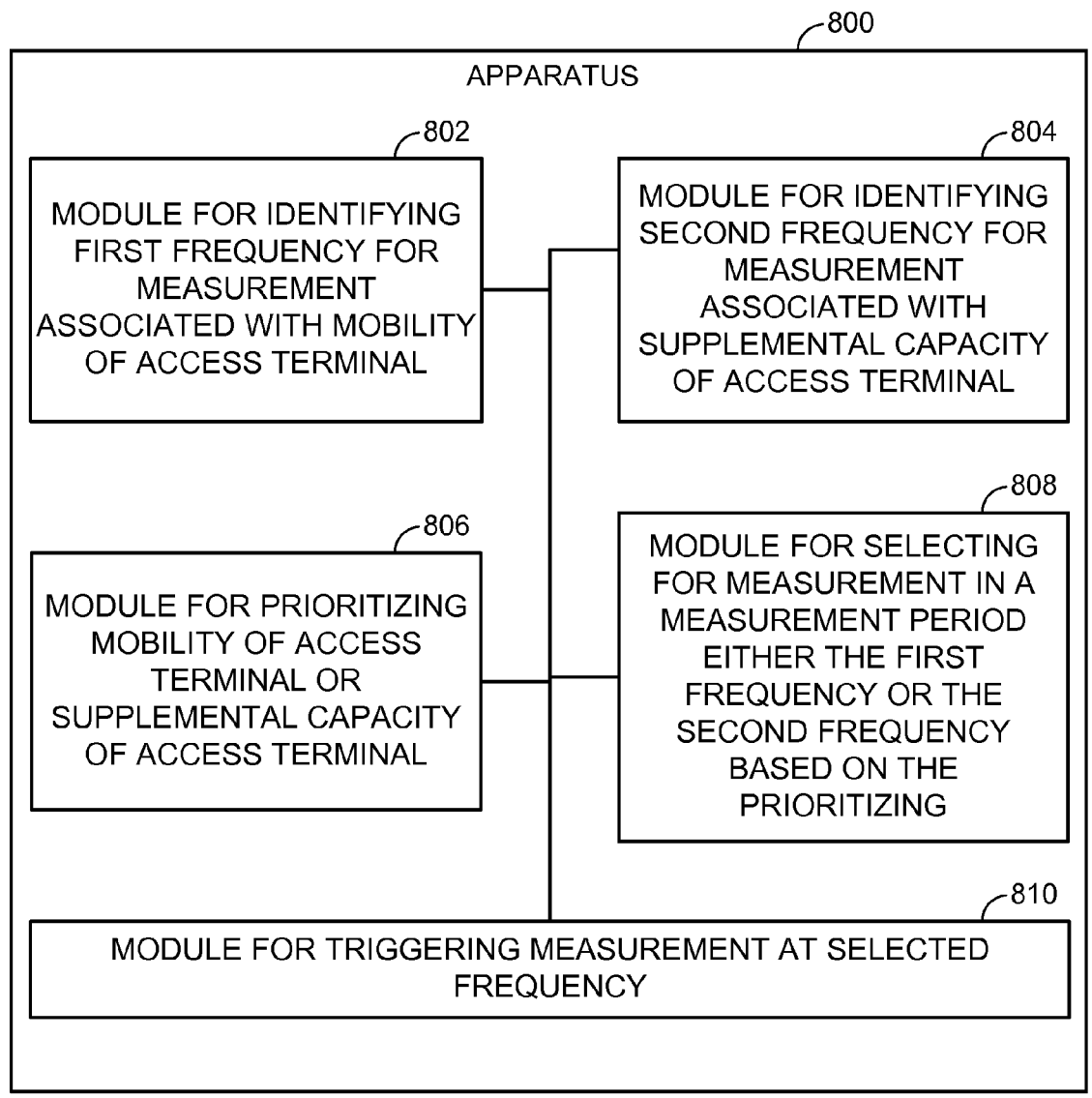
FIG. 8 illustrates an example access point apparatus represented as a series of interrelated functional modules in accordance with an aspect of the disclosure.

FIG. 8 provides an alternative illustration of an apparatus 800 for implementing the access point 110 and/or the access terminal 120 represented as a series of interrelated functional modules. A module for identifying a first frequency for measurement associated with mobility of an access terminal 802 may correspond at least in some aspects to, for example, a communication device or a component thereof as discussed herein (for example, the frequency identifier 144, the frequency identifier 154, or the like). A module for identifying a second frequency for measurement associated with supplemental capacity of the access terminal 804 may correspond at least in some aspects to, for example, a communication controller or a component thereof as discussed herein (for example, the frequency identifier 144, the frequency identifier 154, or the like). A module for prioritizing mobility of the access terminal or supplemental capacity of the access terminal 806 may correspond at least in some aspects to, for example, a communication controller or a component thereof as discussed herein (for example, the prioritizer 146, the prioritizer 156, or the like). A module for selecting for measurement in a measurement period either the first frequency or the second frequency based on the prioritizing 808 may correspond at least in some aspects to, for example, a communication controller or a component thereof as discussed herein (for example, the measurement selector 148, the measurement selector 158, or the like). A module for triggering measurement at the selected frequency 810 may correspond at least in some aspects to, for example, a communication device or a component thereof as discussed herein (for example, the primary RAT transceiver 140, the secondary RAT transceiver 142, the primary RAT transceiver 150, the secondary RAT transceiver 152, or the like). In some implementations, the above-noted components may operate in tandem with the respective processing systems 116, 126 and/or memory components 118, 128 depicted in FIG. 1.

The functionality of the modules of FIG. 8 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 8, as well as other components and functions described herein, may be implemented using any suitable means. Such means also may be implemented, at least in part, using corresponding structure as taught herein. For example, the components described above in conjunction with the "module for" components of FIG. 8 also may correspond to similarly designated "means for" functionality. Thus, in some aspects one or more of such means may be implemented using one or more of processor components, integrated circuits, or other suitable structure as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a non-transitory computer-readable medium embodying a method for prioritizing inter-frequency measurements. The method may include identifying a first frequency for measurement that is associated with mobility of an access terminal for transitioning from a serving primary cell to a target primary cell, identifying a second frequency for measurement that is associated with supplemental capacity of the access terminal for adding a secondary cell to operate in conjunction with the serving primary cell, prioritizing the mobility of the access terminal or the supplemental capacity of the access terminal, selecting for measurement in a measurement period either the first frequency or the second frequency based on the prioritizing, triggering a measurement for the selected frequency.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method for managing inter-frequency measurements, comprising:
    identifying a first frequency for measurement that is associated with mobility of an access terminal for transitioning from a serving primary cell to a target primary cell;
    identifying a second frequency for measurement that is associated with supplemental capacity of the access terminal for adding a secondary cell to operate in conjunction with the serving primary cell;
    prioritizing the mobility of the access terminal or the supplemental capacity of the access terminal;
    selecting for measurement in a measurement period either the first frequency or the second frequency based on the prioritizing; and
    triggering a measurement for the selected frequency.

2. The method of claim 1, wherein the prioritizing comprises:
    anticipating a handover of the access terminal from the serving primary cell to the target primary cell; and
    prioritizing the mobility of the access terminal in response to the anticipating.

3. The method of claim 2, wherein the anticipating of the handover comprises receiving at an access point an A2 event notification from the access terminal.

4. The method of claim 2, wherein the anticipating of the handover comprises receiving at an access point an automatic neighbor relation event notification from the access terminal.

5. The method of claim 1, wherein the prioritizing comprises:
    monitoring utilization of the serving primary cell and any existing secondary cells;
    comparing the monitored utilization to a supplemental capacity threshold; and
    prioritizing the supplemental capacity of the access terminal based on the comparing.

6. The method of claim 5, wherein:
    the monitoring of the utilization comprises determining, by an access point, an amount of data scheduled for transmission; and
    the comparing comprises comparing the amount of data scheduled for transmission to the supplemental capacity threshold.

7. The method of claim 1, wherein:
    identifying the first frequency for measurement comprises determining that the first frequency is associated with licensed spectrum; and
    identifying the second frequency for measurement comprises determining that the second frequency is associated with unlicensed spectrum.

8. The method of claim 1, wherein:
    identifying the first frequency for measurement comprises determining that the first frequency is associated with a downlink-uplink pair; and
    identifying the second frequency for measurement comprises determining that the second frequency is not associated with the downlink-uplink pair.

9. The method of claim 1, wherein the triggering comprises sending, from an access point, a request that the access terminal perform the measurement for the selected frequency.

10. The method of claim 1, wherein the triggering comprises performing, at the access terminal, the measurement for the selected frequency.

11. An apparatus for managing inter-frequency measurements, comprising:
    at least one processor; and
    at least one memory coupled to the at least one processor, the at least one processor and the at least one memory being configured to:
        identify a first frequency for measurement that is associated with mobility of an access terminal for transitioning from a serving primary cell to a target primary cell;
        identify a second frequency for measurement that is associated with supplemental capacity of the access terminal for adding a secondary cell to operate in conjunction with the serving primary cell;
        prioritize the mobility of the access terminal or the supplemental capacity of the access terminal;

select for measurement in a measurement period either the first frequency or the second frequency based on the prioritizing; and trigger a measurement for the selected frequency.

12. The apparatus of claim 11, the at least one processor and the at least one memory being further configured to:

anticipate a handover of the access terminal from the serving primary cell to the target primary cell; and prioritize the mobility of the access terminal in response to the anticipating.

13. The apparatus of claim 12, the at least one processor and the at least one memory being further configured to anticipate the handover by receiving at an access point an A2 event notification from the access terminal.

14. The apparatus of claim 12, the at least one processor and the at least one memory being further configured to anticipate the handover by receiving at an access point an automatic neighbor relation event notification from the access terminal.

15. The apparatus of claim 11, the at least one processor and the at least one memory being further configured to:

monitor utilization of the serving primary cell and any existing secondary cells;

compare the monitored utilization to a supplemental capacity threshold; and prioritize the supplemental capacity of the access terminal based on the comparing.

16. The apparatus of claim 15, the at least one processor and the at least one memory being further configured to:

monitor utilization at an access point by determining an amount of data scheduled for transmission; and compare the amount of data scheduled for transmission to the supplemental capacity threshold.

17. The apparatus of claim 11, the at least one processor and the at least one memory being further configured to:

identify the first frequency for measurement by determining that the first frequency is associated with licensed spectrum; and identify the second frequency for measurement by determining that the second frequency is associated with unlicensed spectrum.

18. The apparatus of claim 11, the at least one processor and the at least one memory being further configured to:

identify the first frequency for measurement by determining that the first frequency is associated with a downlink-uplink pair; and identify the second frequency for measurement by determining that the second frequency is not associated with the downlink-uplink pair.

19. The apparatus of claim 11, the at least one processor and the at least one memory being further configured to trigger by sending, from an access point, a request that the access terminal perform the measurement for the selected frequency.

20. The apparatus of claim 11, the at least one processor and the at least one memory being further configured to trigger by performing, at the access terminal, the measurement for the selected frequency.

21. An apparatus for managing inter-frequency measurements, comprising:

means for identifying a first frequency for measurement that is associated with mobility of an access terminal for transitioning from a serving primary cell to a target primary cell;

means for identifying a second frequency for measurement that is associated with supplemental capacity of the access terminal for adding a secondary cell to operate in conjunction with the serving primary cell;

means for prioritizing the mobility of the access terminal or the supplemental capacity of the access terminal;

means for selecting for measurement in a measurement period either the first frequency or the second frequency based on the prioritizing; and means for triggering a measurement for the selected frequency.

22. The apparatus of claim 21, means for prioritizing comprising:

means for anticipating a handover of the access terminal from the serving primary cell to the target primary cell; and means for prioritizing the mobility of the access terminal in response to the anticipating.

23. The apparatus of claim 21, means for prioritizing comprising:

means for monitoring utilization of the serving primary cell and any existing secondary cells;

means for comparing the monitored utilization to a supplemental capacity threshold; and means for prioritizing the supplemental capacity of the access terminal based on the comparing.

24. The apparatus of claim 21 further comprising:

means for identifying the first frequency for measurement comprising means for determining that the first frequency is associated with licensed spectrum; and means for identifying the second frequency for measurement comprising means for determining that the second frequency is associated with unlicensed spectrum.

25. The apparatus of claim 21 further comprising:

means for identifying the first frequency for measurement comprising means for determining that the first frequency is associated with a downlink-uplink pair; and means for identifying the second frequency for measurement comprising means for determining that the second frequency is not associated with the downlink-uplink pair.

26. A non-transitory computer-readable medium including code, which, when executed by a processor, causes the processor to perform operations for managing inter-frequency measurements, the non-transitory computer-readable medium comprising:

code for identifying a first frequency for measurement that is associated with mobility of an access terminal for transitioning from a serving primary cell to a target primary cell;

code for identifying a second frequency for measurement that is associated with supplemental capacity of the access terminal for adding a secondary cell to operate in conjunction with the serving primary cell;

code for prioritizing the mobility of the access terminal or the supplemental capacity of the access terminal;

code for selecting for measurement in a measurement period either the first frequency or the second frequency based on the prioritizing; and code for triggering a measurement for the selected frequency.

27. The non-transitory computer-readable medium of claim 26, the code for prioritizing comprising:

code for anticipating a handover of the access terminal from the serving primary cell to the target primary cell; and code for prioritizing the mobility of the access terminal in response to the anticipating.

28. The non-transitory computer-readable medium of claim 26, the code for prioritizing comprising:
  code for monitoring utilization of the serving primary cell and any existing secondary cells;
  code for comparing the monitored utilization to a supplemental capacity threshold; and
  code for prioritizing the supplemental capacity of the access terminal based on the comparing.

29. The non-transitory computer-readable medium of claim 26 further comprising:
  code for identifying the first frequency for measurement comprising code for determining that the first frequency is associated with licensed spectrum; and
  code for identifying the second frequency for measurement comprising code for determining that the second frequency is associated with unlicensed spectrum.

30. The non-transitory computer-readable medium of claim 26 further comprising:
  code for identifying the first frequency for measurement comprising code for determining that the first frequency is associated with a downlink-uplink pair; and
  code for identifying the second frequency for measurement comprising code for determining that the second frequency is not associated with the downlink-uplink pair.

* * * * *